Patented Aug. 24, 1954

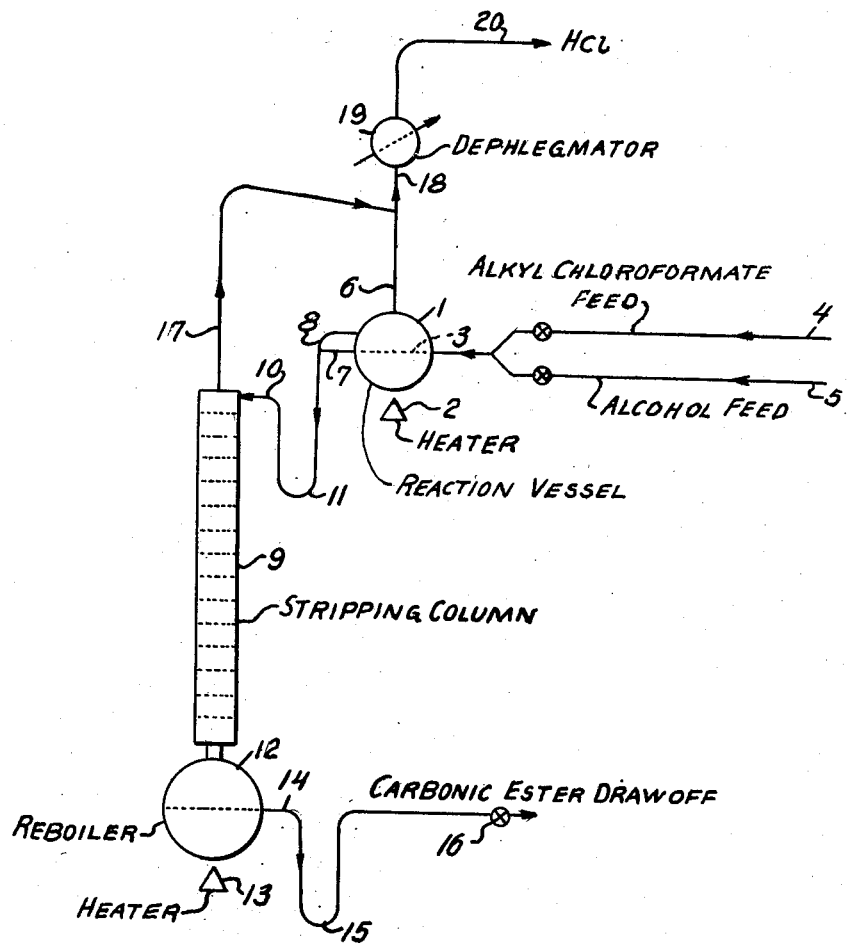

2,687,425

UNITED STATES PATENT OFFICE 2,687,425

PRODUCTION OF ALKYL CARBONATES

Merton H. Douthitt, Ossining, N. Y., assignor to National Distillers Products Corporation, New York, N. Y., a corporation of Virginia Application December 21, 1951, Serial No. 262,875

6 Claims. (Cl. 260—463)

This invention relates to the production of alkyl esters of carbonic acid and more particularly to the production of such esters by the well-known reaction of alkyl chloroformate with an alkyl alcohol in which the number of carbon atoms is equal to, or less than, those present in the alkyl group of the chloroformate. The invention provides an improved method of carrying out this reaction.

Such carbonic esters, especially diethyl carbonate, are useful as solvents and as reactants. Diethyl carbonate is particularly useful and versatile as a lacquer solvent. It has an extremely low acidity, is stable and has a mild odor.

It has previously been proposed to produce diethyl carbonate, for instance, by reacting ethyl chloroformate with ethyl alcohol. This reaction has heretofore been carried out successfully only in batch operations and has been attended by low yields, low reaction rates and difficulty with temperature control and further has resulted in an impure product, costly to purify.

The reaction of the alcohol with the alkyl chloroformate results in the liberation of hydrogen chloride. In conventional batch operations there is a tendency for the hydrogen chloride thus formed to react with the alcohol to form water and the alkyl chloride. Not only does this side reaction consume alcohol, but the water thus formed tends to hydrolyze the alkyl chloroformate. As a result of these side reactions the yield is markedly reduced.

Further, in these batch operations the rate of the desired reaction becomes slower as the reaction proceeds and the reactants become diluted by the reaction product. In practice, excess alcohol has been added to force the reaction more rapidly and more nearly to completion. However, the presence of excess alcohol further tends to dissolve and retard the evolution of the hydrogen chloride, so that several days are required for the reaction of the batch to approach completion. Also, the concentration of hydrogen chloride in the alcohol creates a condition highly conducive to the formation of water and the hydrolyzing of the alkyl chloroformate. Further in batch operation it has been necessary to maintain relatively low reaction temperatures, in order to effectively control the reaction, which is highly exothermic.

It is an objective of my present invention to provide a process of the continuous type for preparing such esters and by which the previously experienced disadvantages may be minimized or entirely avoided. These objects are attained by my present invention and still further advantages are derived therefrom, as will appear from the following description of my improved process.

In accordance with the process of my present invention the alkyl esters of carbonic acid are continuously produced in high yield and a high degree of purity by maintaining a body of the reaction mixture, in a reaction vessel at a reaction temperature, continuously feeding the alkyl chloroformate and the alcohol (anhydrous), to the reaction vessel advantageously in substantially equal molar proportions, continuously and separately withdrawing vapors and liquid from the reaction vessel, the latter at a rate such as to maintain substantially constant the volume of liquid in said vessel and separating the resultant alkyl ester of carbonic acid from the withdrawn liquid by fractional distillation. The resulting vapors and the vapors withdrawn as such from the reaction vessel are with advantage dephlegmated to separate unreacted alcohol and alkyl chloroformate from the vapors, and the unreacted constituents returned to the reaction vessel. The uncondensed vapors, which contain the hydrogen chloride, are withdrawn from the system without permitting further contact between those vapors and the body of liquid in the reaction vessel.

Alcohol is a very good solvent for hydrogen chloride and the latter is not readily separated therefrom by fractionation. Further, when subjected to increased temperatures, the hydrogen chloride reacts with the alcohol to form the corresponding alkyl chloride and water. A particular advantage derived from my present process is that thereby the formation of alcoholic solutions of hydrogen chloride is minimized, if not entirely prevented. This is accomplished by the rapid removal of the hydrogen chloride from the reaction mixture and the avoiding of the scrubbing of effluent gases containing hydrogen chloride by the alcoholic feed or by the contents of the reaction vessel. By my process, contact between the alcohol and the hydrogen chloride formed by the reaction is reduced to a minimum. The hydrogen chloride is by my process continuously separated from the reacting mixture and withdrawn from the system without further contact with the reaction product or the reactants.

The process is, with advantage, carried out at about atmospheric pressure so as to promote the removal of hydrogen chloride. However, somewhat higher, or even lower, pressures may be used. The optimum temperature of the reacting mixture will vary somewhat depending upon the particular alkyl chloroformate and alcohol being reacted. In general, the body of liquid within the reaction vessel should be maintained at a temperature within the range extending from about the boiling point of the particular alkyl chloroformate down to about 3 to 6° C. below the boiling point of the alcohol.

The invention will be more particularly described and illustrated with reference to the accompanying drawing which represents conventionally and diagrammatically one type of apparatus particularly adapted to the carrying out of the process.

In the drawing, the reaction vessel is represented at 1 and means adapted to the heating of the vessel is indicated at 2. A body of reaction mixture in liquid form is maintained in the vessel, the upper surface of the liquid being indicated at 3. The alkyl chloroformate and alcohol, advantageously in substantially equal molar proportions, are continuously fed to the reaction vessel through lines 4 and 5, respectively, and vapors and gases removed therefrom through vapor line 6. The liquid reaction mixture continuously overflows from the vessel through line 7, which is connected to the vapor space of the vessel by line 8, and flows into the upper portion of the stripping column 9 through line 10 in which there is interposed a trap 11.

Positioned at the lower end of the stripping column is a reboiler 12 provided with heating means indicated at 13 and a draw-off line 14 in which there is interposed a trap 15 and a flow control valve 16.

In the stripping column, hydrogen chloride and unreacted alcohol and alkyl chloroformate are fractionally distilled from the reaction mixture passed to the column from the reaction vessel, and the carbonic ester resulting from the reaction continues downwardly through the column into the reboiler wherein a body of the carbonic ester is accumulated and is maintained at a temperature below the boiling point of the particular carbonic ester, but sufficiently high to drive off residual hydrogen chloride and to assure a substantially complete conversion of the alkyl chloroformate.

Hydrogen chloride and unreacted alcohol and alkyl chloroformate pass from the top of the stripping column through a heat insulated vapor line 17, which is connected with line 6. The combined vapors and gases from the stripping column and from the reaction vessel pass through line 18 to dephlegmator 19, which is maintained at a temperature at which the particular alcohol and alkyl chloroformate are condensed. The condensate from the dephlegmator is returned to the reaction vessel through line 6, while the hydrogen chloride is drawn off through line 20.

By the process, the carbonic ester is withdrawn from the system at a rate approximately equivalent to the feed rate of the reactants, and the hydrogen chloride is removed from the system substantially as soon as it is formed. The hydrogen chloride is thus obtained at a uniform rate and may be economically recovered for other uses.

In starting up the operation, it has been found advantageous to charge the reaction vessel with relative pure anhydrous carbonic ester corresponding to that to be made and to establish an operational temperature and balance of reflux using this material before starting to feed the reactants.

In the manufacture of diethyl carbonate, for instance, by the above described process at substantially atmospheric pressure, I have found it desirable to maintain the liquid mixtures and the vapors above said mixture in the reaction vessel at a temperature within the range of about 70° to about 95° C. and to return the condensate from the dephlegmator to the reaction vessel, thus permitting a short holding time in the reaction vessel and promoting rapid escape of the hydrogen chloride from the boiling mixture. When these conditions are met, the reaction proceeds smoothly with excellent yield and no evidence of secondary reactions. Where the operation is carried out below the temperatures mentioned, the escape of hydrogen chloride vapors is inhibited. This may lead to a depression of the reaction rate and decreased yield and efficiency in the separation of the products by ordinary stripping procedures such as described.

Where desired, the boiling temperature of the mixture in the reaction vessel may be raised by incorporating in the mixture a small excess of the alkyl chloroformate, as by increasing the rate of the alkyl chloroformate feed for a suitable period of time. This procedure may, with advantage, be employed during the starting up period, for instance.

The invention will be further illustrated by the following specific examples:

*Example 1*

Apparatus arranged as shown in the drawing was constructed using as the reaction vessel, a 500 milliliter glass vessel, equipped with a vapor line adapted to the withdrawal of vapors from the vessel and an overflow line so positioned and arranged as to maintain a volume of 250 milliliters of liquid in the vessel. This overflow line was connected with the upper end of a 7/8 inch bore vacuum-jacketed, 15 plate laboratory bubble cap distilling column, a liquid seal being positioned in the overflow line. A one liter flask, adapted to be heated and equipped with a draw-off line so constructed and arranged as to maintain a liquid seal and to withdraw continuously from the flask any accumulated liquid in excess of 500 milliliters, was connected to the lower end of the column, as the reboiler, substantially as shown in the drawing. An insulated vapor line connected the top of the column with a vapor line from the reaction vessel immediately below a water jacketed dephelgmating tube positioned in said vapor line, said tubes being so arranged as to return to the reaction vessel the condensate from the dephlegmator. Uncondensed vapors from the dephlegmator were separately drawn off and discharged from the system. The reaction vessel was also equipped with a line for continuously introducing the combined feed.

The reaction vessel of the apparatus just described was charged with substantially pure anhydrous diethyl carbonate, the vessel heated and the apparatus brought to a steadily refluxing state. Then, a mixed feed, consisting of approximately 28 grams of ethanol per hour and 65 grams per hour of technical grade ethyl chloroformate, which analyzed 95.78% ethyl chloroformate, 4.04% ethanol and 0.18% HCl, was continuously charged to the reaction vessel, diethyl carbonate being withdrawn from the reboiler at a rate such as to maintain a constant operating level in the equipment. The desired reaction became manifest when the boiling contents of the reaction vessel reached a temperature about 94° C.

This procedure was continued for two days in order to remove entirely from the apparatus the initial charge of diethyl carbonate. At this point, the mixed continuous feed was adjusted to 25.5 grams of ethanol per hour and 65.3 grams per hour of the technical grade ethyl chloroformate just described. By-product hydrogen chloride vapors were continuously withdrawn from the top of the dephlegmator and diethyl carbonate, analyzing 98.44% diethyl carbonate, 1.3% ethanol, 0.26% chloroformate (all by weight) and 0.0% hydrogen chloride, was continuously withdrawn from the reboiler at the rate of 67.8 grams per hour. Throughout this period, the contents of the reaction vessel were maintained at a boiling point within the range of 74° to 82° C. The carbonic ester yield, based on the ethyl chloroformate consumed, was 98.1% and, based on the ethanol consumed, was 95.6%.

In the operation described, the dephlegmator was cooled by passing 68° F. water upwardly through the water jacket to maintain a condensate temperature close to the boiling temperature of the contents of the reaction vessel so as to avoid undesirable retention of hydrogen chloride in the system while effecting the return of at least the major portion of unreacted raw materials to the reaction vessel. The stripping column head temperature is also, with advantage, maintained at approximately the temperature of the reaction vessel, usually about two or three degrees lower. The reboiler temperature should be sufficiently high to prevent any substantial contamination of the product with hydrogen chloride or unreacted alkyl chloroformate.

In apparatus substantially as described, but of pilot plant size, satisfactory operation in the production of diethyl carbonate has been obtained using a reaction vessel temperature of 71° C. and a reboiler temperature of 110° C., the product withdrawn from the reboiler consisting of 92% diethyl carbonate and 8% ethanol.

While I have herein illustrated my process, as applied to reactions in which the alkyl chloroformate was reacted with a corresponding alkyl alcohol, it will be understood that the invention is likewise applicable to the production of mixed carbonates by using as the alcohol reactant one having a lower boiling point than the alcohol corresponding to the alkyl radical of the chloroformate or, in other words, an alcohol containing a fewer number of carbon atoms than present in the alkyl radical of the particular alkyl chloroformate used.

Further, the invention is applicable to the production of a wide range of esters of carbonic acid, and may, in fact, be used with advantage in the reacting of any alkyl chloroformates and alcohols which are capable of reacting to form the carbonate esters and hydrogen chloride. As previously noted, this reaction is well known. It is recognized that the reaction rates are somewhat slower where the higher alcohols are used. However, my improved process effects a rapid removal of the hydrogen chloride from the reaction mixture as formed, thus minimizing contact between the hydrogen chloride and the alcohol, as previously noted.

The invention may be used, with particular advantage, for instance, in the production of dimethyl carbonate by reacting methyl alcohol with methyl chloroformate; in the production of dipropyl carbonate by reacting propyl alcohol with propyl chloroformate; in the production of diisopropyl carbonate by reacting isopropyl alcohol with isopropyl chloroformate; in producing propyl-ethyl carbonate by reacting ethyl alcohol with propyl chloroformate; or in the production of ethyl-methyl carbonate by reacting methyl alcohol with ethyl chloroformate. In the production of such mixed esters, it is necessary, as previously noted, that the number of carbon atoms in the alcohol reactant be less than the number of carbon atoms in the alkyl group of the alkyl chloroformate reactant.

I claim:

1. A continuous process for the production of alkyl esters of carbonic acid by reacting an alkyl chloroformate with an alcohol, comprising maintaining a body of the reaction mixture in a reaction vessel at a temperature within the range extending from about the boiling point of the particular alkyl chloroformate to about 6° C. below the boiling point of the alcohol, continuously feeding to the reaction vessel substantially equal molar proportions of the alkyl chloroformate and the alcohol, continuously withdrawing liquid from the reaction vessel, stripping hydrogen chloride and unreacted alcohol and chloroformate from the withdrawn liquid by passing said liquid downwardly through a stripping column, heating the remainder of the withdrawn liquid to a temperature substantially the boiling point of the carbonic ester and passing vapors from the heated remaining liquid in contact with the descending liquid in said column, passing hydrogen chloride and unreacted alcohol and chloroformate vapors from the upper end of the column, condensing the alcohol and chloroformate and separating the hydrogen chloride therefrom, returning the condensed alcohol and chloroformate to said reaction chamber, and continuously withdrawing the carbonic ester from the lower end of said column.

2. The process of claim 1 in which the feed to the reaction vessel is substantially free from hydrogen chloride.

3. The process of claim 1 in which the rate of withdrawal from the reaction vessel is so coordinated with the rate of feed thereto, as to maintain substantially constant the volume of liquid in said vessel.

4. The process of claim 1 in which ethyl chloroformate is reacted with ethyl alcohol and the temperature of the reaction vessel is maintained within the range of 70° to 95° C.

5. The process of claim 1 in which the alcohol reactant is that corresponding to the alkyl radical of the alkyl chloroformate reactant.

6. The process of claim 1 in which the alcohol reactant is one containing a fewer number of carbon atoms per molecule than contained in the alkyl radical of the alkyl chloroformate reactant.

References Cited in the file of this patent

UNITED STATES PATENTS

| Number | Name | Date |
| --- | --- | --- |
| 1,603,689 | Hammond | Oct. 19, 1926 |
| 1,603,703 | Mitchell | Oct. 19, 1926 |
| 1,638,014 | Mitchell | Aug. 9, 1951 |